E. Carver.
Rolling Plates and Bars.
Nº 950. Patented Sept. 27, 1838.
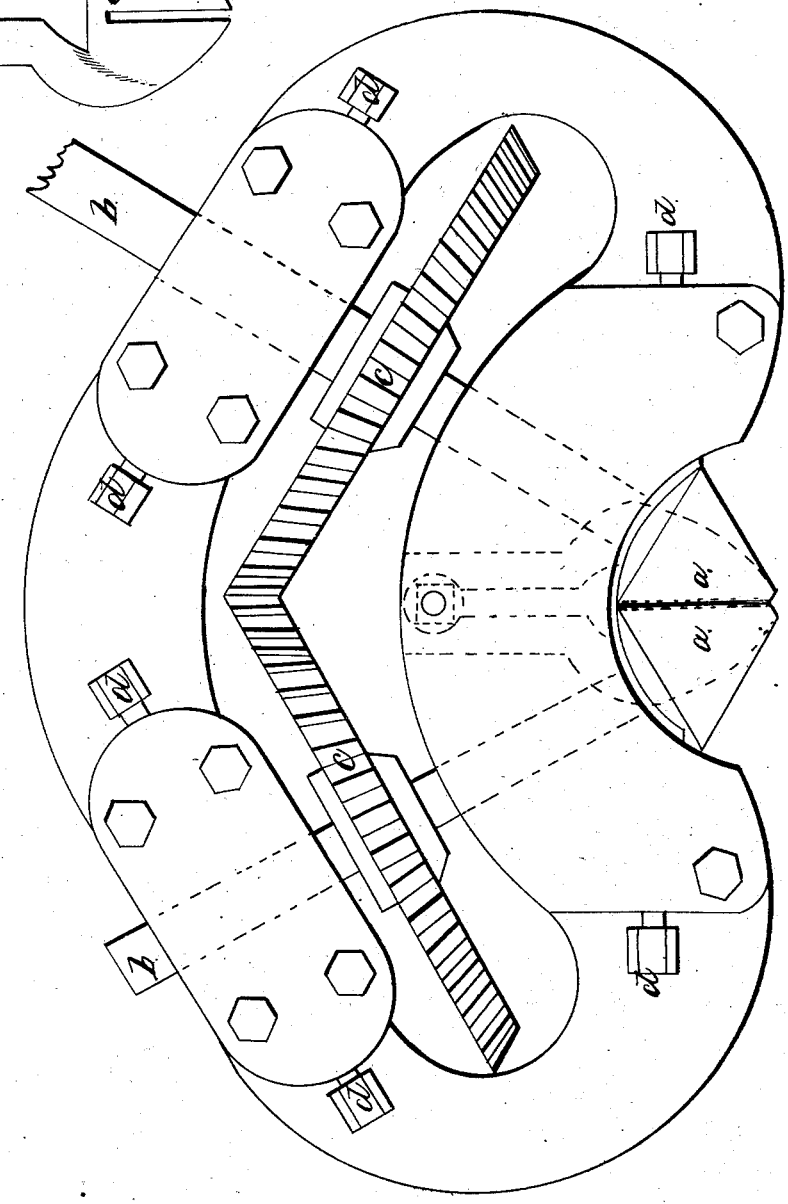

UNITED STATES PATENT OFFICE.

ELEAZER CARVER, OF BRIDGEWATER, MASSACHUSETTS.

ROLLING-MILL FOR ROLLING CIRCULAR SAWS, SAW-GIN PLATES, &c.

Specification of Letters Patent No. 950, dated September 27, 1838.

*To all whom it may concern:*

Be it known that I, ELEAZER CARVER, of Bridgewater, in the county of Plymouth and State of Massachusetts, have invented an Improved rolling-mill for the purpose of rolling steel into circles, semicircles, or other segments of curves intended for the manufacturing of circular-saws for cotton-gins, but applicable also to the rolling of metal for other purposes whenever similar forms are required; and I do hereby declare that the following is a full and exact description thereof.

Figure 1, in the accompanying drawing is a top view of the machine, which consists principally of two steel or iron conical rollers $a$, $a$, which are sustained by, and are in one piece with the shafts $b$, $b$, geared into each other by the bevel wheels $c$, $c$; the bearings in which these shafts run, are made adjustable by means of screws $d$, $d$, or in any of the well known ways of making such adjustments. The shafts may be made to revolve by means of a winch, or in any other convenient manner. When strips of metal are passed between conical rollers of this description, one of its edges will be thereby stretched, or elongated, more than the other, in a degree dependent upon the adjustment of the rollers, which may be such as shall reduce the thickness of the plate, at one of its edges only, leaving the other unreduced, and causing the plate to vary regularly in thickness in its cross section.

The usual form given to the pieces of steel, of which gin saws are made, is that of a semicircle, and the strips of metal, must, of course, be cut into such lengths as will correspond therewith, or with any other segment of a circle.

The steel plates, after being cut to a suitable length and width, are to be heated red hot, and these passed between the rollers, which must have been previously adjusted to suit the plates. The plates must be held vertically as they are passed in, so as to stand at right angles with the axis of the rollers; and as the size of the circle which they form will depend upon the part of the rollers through which they pass, the circle being larger in proportion as the rolling is effected nearer to the base of the cones, it is necessary to use a gage to regulate the plates in this particular; this gage is shown separately in Figs. 2 and 3, and its place upon the mill is represented by dotted lines, to avoid its obscuring the parts below it. This gage is adjustable by means of a tightening screw, so that its shoulder $e$, at the termination of the opening, through which the plates are to be passed, may be placed over the proper part of the rollers.

What I claim as my invention, and desire to secure by Letters Patent, is—

The combination of the conical rollers, with the gage plate, the whole being constructed and operating substantially as above described, for the purpose of rolling gin saw plates, or other strips of metal requiring to be curved widthwise.

ELEAZER CARVER.

Witnesses:
SOLOMON HAYWARD,
SAMUEL LEONARD, Jr.